United States Patent [19]
Stringer et al.

[11] Patent Number: 5,223,968
[45] Date of Patent: Jun. 29, 1993

[54] FIRST COME ONLY SERVED COMMUNICATIONS NETWORK

[75] Inventors: Jeff T. Stringer, Pittsburgh; Charles W. Einolf, Jr., Export, both of Pa.

[73] Assignee: The United States of America as represented by the Secretary of the Air Force, Washington, D.C.

[21] Appl. No.: 631,136

[22] Filed: Dec. 20, 1990

[51] Int. Cl.⁵ .......................................... H04B 10/00
[52] U.S. Cl. .................................. 359/164; 359/154; 370/60; 370/60.1
[58] Field of Search ............... 359/109, 117, 118, 125, 359/128, 137, 139, 164, 172; 385/17, 24; 370/58.2, 58.3, 60, 60.1, 94.1, 94.3, 85.6; 340/825.02, 825.50, 825.51

[56] References Cited

U.S. PATENT DOCUMENTS

| | | | |
|---|---|---|---|
| 3,871,743 | 3/1975 | Fulenwider | 350/96 WG |
| 4,347,498 | 8/1982 | Lee et al. | 340/825.02 |
| 4,399,531 | 8/1983 | Grande et al. | 370/60 |
| 4,470,154 | 9/1984 | Yano | 455/607 |
| 4,516,272 | 5/1985 | Yano | 455/607 |
| 4,731,878 | 3/1988 | Vaidya | 455/600 |
| 4,740,954 | 5/1988 | Cotton et al. | 340/825.2 |
| 4,797,882 | 1/1989 | Maxemchuk | 370/94 |
| 4,866,702 | 9/1989 | Shimizu et al. | 370/85.6 |
| 4,933,933 | 6/1990 | Dally et al. | 370/85.12 |
| 5,023,864 | 6/1991 | Cloonan et al. | 359/109 |
| 5,088,091 | 2/1992 | Schroeder et al. | 370/60 |

Primary Examiner—Edward L. Coles, Sr.
Assistant Examiner—Rafael Bacares
Attorney, Agent, or Firm—William Stephanishen; Donald J. Singer

[57] ABSTRACT

A communications network grid having a matrix of nodes at which transmitters or receivers are connected to transmit and receive signals from any origin or destination. Each node utilizes first come only served control logic to retransmit the first received signal.

6 Claims, 7 Drawing Sheets

FIRST COME ONLY SERVED COMMUNICATIONS NETWORK

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to a communication network and, more particularly, to a first come only served communication network.

The state of the art of signal selective communication networks is well represented and alleviated to some degree by the prior art apparatus and approaches which are contained in the following U.S. Patents:

U.S. Pat. No. 3,871,743 issued to Fulenwider on Mar. 18, 1975;

U.S. Pat. No. 4,470,154 issued to Yano on Sep. 4, 1984;

U.S. Pat. No. 4,516,272 issued to Yano on May 7, 1985; and

U.S. Pat. No. 4,731,878 issued to Vaidya on Mar. 15, 1988.

The Fulenwider patent is directed to an optical crosspoint switching matrix comprising an array of several stags of subswitches. Each subswitch includes a number of inlets and outlets of optical channels. Signals conveyed on the optical channels are sequences of "on and off" pulses, grouped in time slot, assigned to the subscribers communicating at that instant. Each subswitch functions to steer the time slot pulses from a given inlet to a particular outlet by acoustical beam steerers using acoustic-optic interaction.

The Yano patent '154 discloses an optical communication network which includes a plurality of nodes and optical fibers for interconnecting the nodes whereby an optical signal may be transmitted from a source node to a destination node which may be determined selectively. Each node includes input channels, output channels and a connection control device for controlling the connection between the input and output channels.

The Yano patent '272 describes a communication network which includes a plurality of nodes which are connected by transmission lines, preferably of optical fibers. One or more terminals such as general purpose computers are connected to selected ones of the nodes also via the transmission lines. Each of the nodes comprises a plurality of input channels, a like plurality of output channels and a connection controller for controlling the connecting condition between the input and output channels. Each of the input channels is paired with one of the output channels.

The Vaidya patent discusses a self-routing switch node combining electronic and photonic switching. A node is responsive to an address received via the electrical sublink of an input link to establish both an electrical and photonic connection for the subsequent communication of both electrical and photonic data to an output link designated by the address. The switch node selects the designated output link from a set of similarly address designated output links all of which are equally capable of establishing the path.

While the above-cited references are instructive, there still remains a need to provide an apparatus which distributes and transmits incoming signals to a distribution mode on the basis of signal arrival. The present invention is intended to satisfy that need.

SUMMARY OF THE INVENTION

The present invention utilizes a first come only served communication network that provides decentralized routing, adaptive routing, and access and collision avoidance. The network comprises a grid with the lines denoting branches and the junction of branches denoting nodes. The users access the communication network at the nodes for both transmission and reception. One form of transmission is called flooding which is a technique wherein every node receives a copy of the message whether or not the nodes are the intended receiver. While this network may operate either electrically or optically, an optical system using passive fiber optic couplers would suffer adverse affects from flooding, since it would make the reception of messages impossible due to intersymbol and multipath interference. The first come only served node technique avoids these problems by only accepting the reception on the first branch that the signal was received on.

It is one object of the invention to provide an improved first come only served communication network.

It is another object of the invention to provide an improved first come only served communication network that provides decentralized signal routing between the source and the destination.

It is still another object of the invention to provide an improved first come only served communication network that guarantees that the destination node will receive the signal via the shortest possible path without any knowledge of the current network configuration.

It is yet another object of the invention to provide an improved first come only served communication network that resolves the intersymbol interference (ISI) problem inherent in uncontrolled grid network flooding caused by multiple paths between the source node and the destination node.

It is an even further object of the invention to provide an improved first come only served communication network which whenever a signal is present on more than one input, passes only the signal that appeared first to all output branches.

It is still another object of the invention to provide an improved first come only served communication network that does not pass the same signal more than once.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
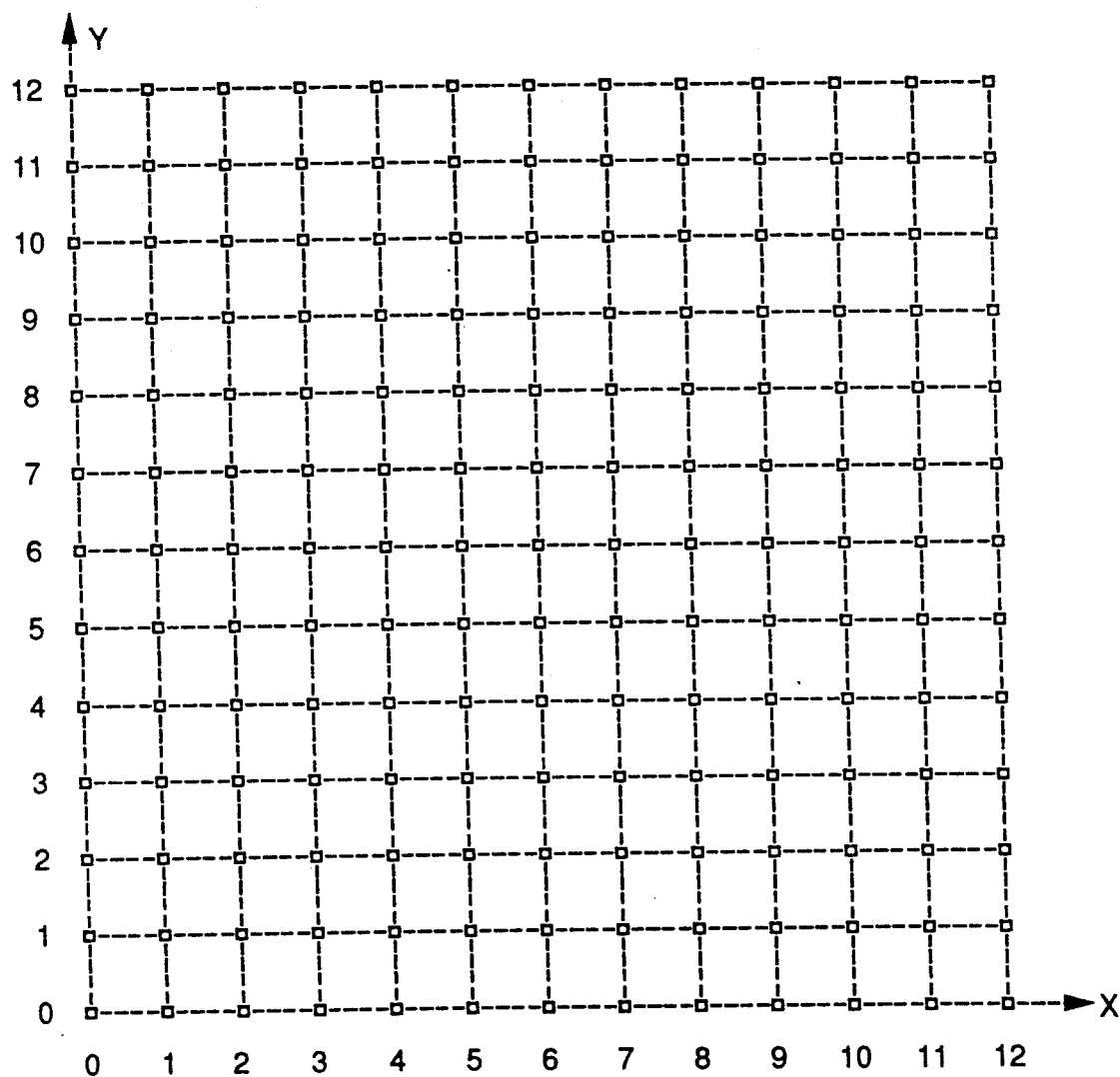
FIG. 1 is a graphical representation of network grid which is arranged in a 12×12 matrix, according to the presentation.

Referring now to FIG. 1, there is shown a graphical representation of a network grid with nodes having four branches. The horizontal coordinate X is labelled from 0 to 12 and the vertical coordinate Y is also labelled 0 to 12. The nodes are designated in X, Y coordinates, thus the node 0, 0 is in the lower left hand corner while node 12, 12 is in the upper right hand corner. Each node which is represented by an "0", is located at the junction of three or four branches in the present two dimensional representation. The lines which connect adjacent nodes, are called branches. It is assumed that the users on the network are located in the nodes, i.e., access must be made at the nodes. Flooding the network with the various messages offers the most advantages from a reliability point of view. Flooding is the technique where every node receives a copy of the message whether or not the node is the intended receiver. However, if the nodes consisted of passive fiber optic couplers, flooding would make reception of messages impossible due to intersymbol and multipath interference. The first come only served node avoids these problems by only accepting the reception on the first branch that the signal was received on.

Figure 2:
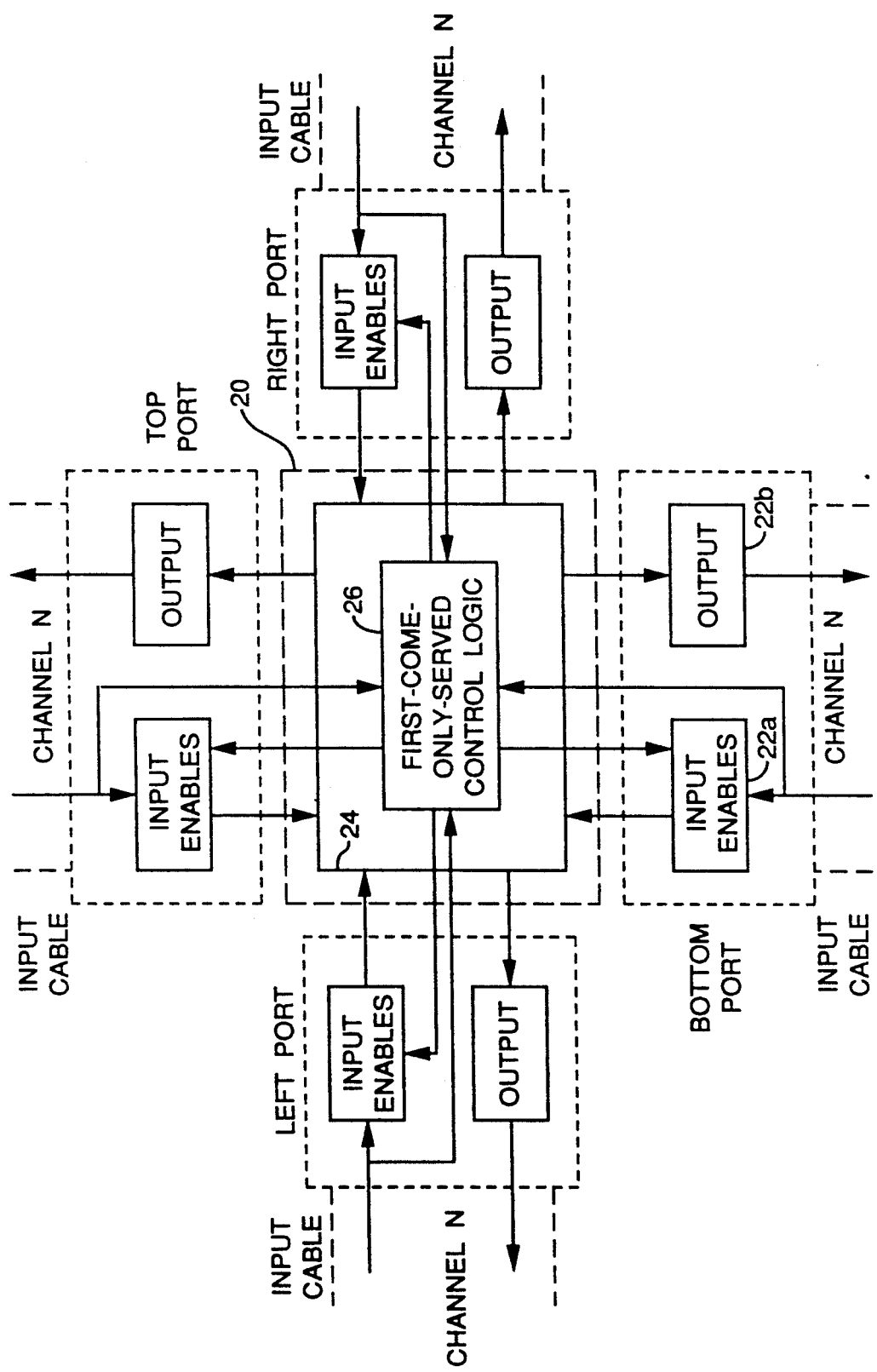
FIG. 2 is a block diagram of a network grid node which has four branches.

FIG. 2 is a block diagram of a four branch first come only served node. Each of the four branches to node 20 terminate in a port which are labelled as shown. Each port comprises an input enable unit 22a and the output unit 22b are connected to a signal bus 24 which distributes a received input signal to all of the output units 22b. The signal on the input line is directly applied to the input unit 22a and to the first come only served logic unit 26. The first come only served logic unit 26 determines which of the input signal to the ports is the first arrival and activates the corresponding input enable unit with an enable signal. Once an input enable unit is enabled, the input signal is passed through that input enable unit to the signal bus 24 and thereby applied to all the output units which are connected to the outgoing branches of the node. It should be noted that CHANNEL N is shown in FIG. 2. For an optical system, channels are assumed to be wavelengths an these wavelengths are multiplexed onto the fiber. So for N channels, the first come only served node has to have N versions of FIG. 2—one for each channel.

Figure 3:
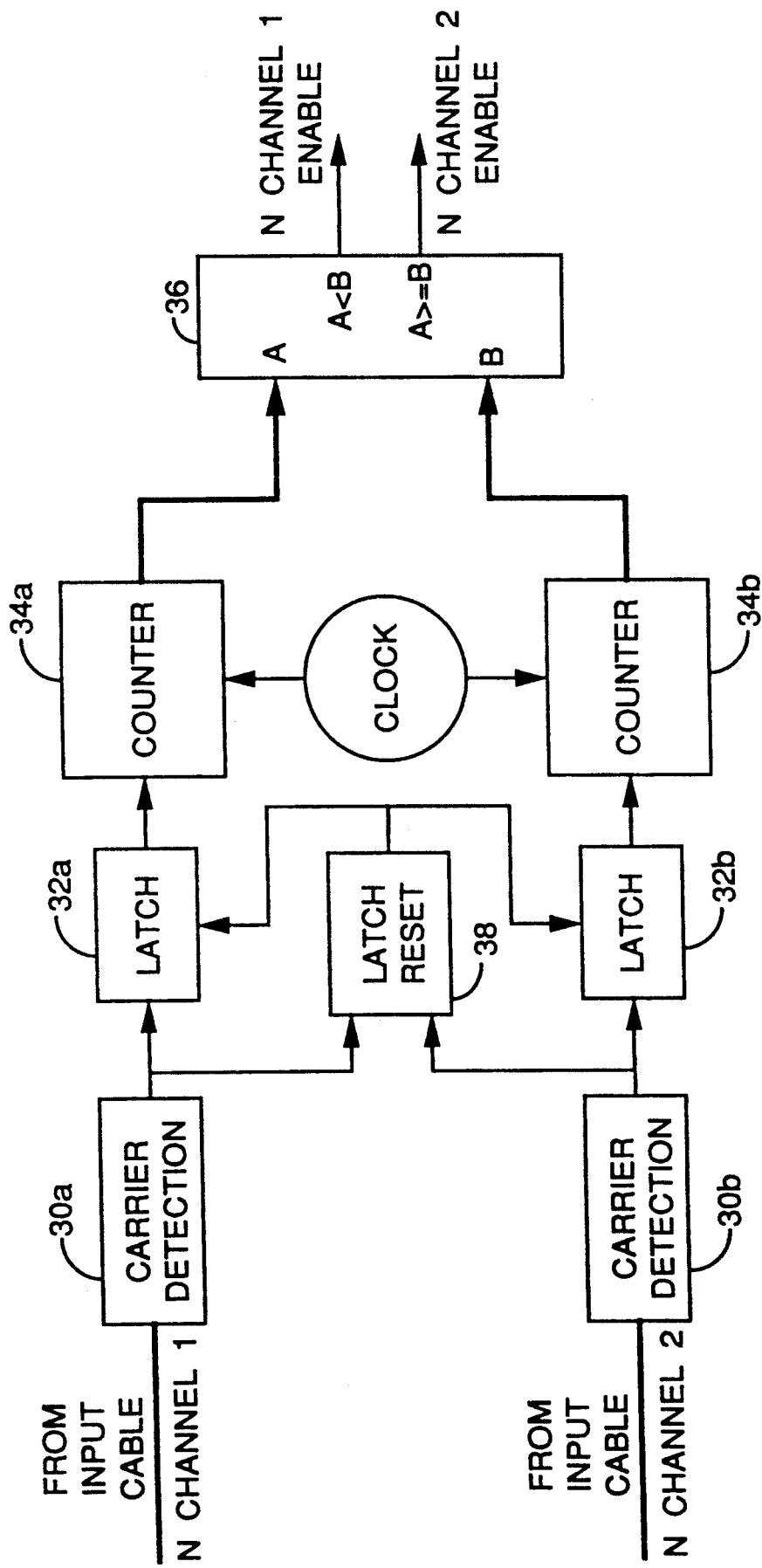
FIG. 3 is a block diagram of a first come only served control logic unit for a two signal channel.

In FIG. 3 there is shown a block diagram of the first come only served (FCOS) control logic unit for two channels. The apparatus compares the time of arrival of all the input communication signals. The signal that arrived first, i.e., the signal that has the earliest time, is then allowed to be broadcast to the outputs, i.e., the enable signal for that channel is asserted. There is shown in FIG. 3 one method of implementing the logic control unit for two channels. Of course, this logic control method may be scaled for any number of channels. The control logic unit receives input signals on N channels 1 and 2 which are respectively connected to carrier detection units 30a and 30b. The detected carriers are respectively applied to latch units 32a, 32b which are then latched. Once a carrier has been detected, and the corresponding latch unit latched, either counter 34a or 34b associated with that channel is stopped, giving a count (time) of arrival. This is then compared with the counters of all other channels in comparator unit 36. Assuming the count is a linear progression and that there are enough bits to eliminate the possibility of counter rollover, the enable line of the channel with the smallest count is asserted. It should be noted that when all channels are void of a signal, the latch units 32a, 32b are reset by the latch reset unit 38. This is one method of implementing the first come only served communication network.

Figure 4:
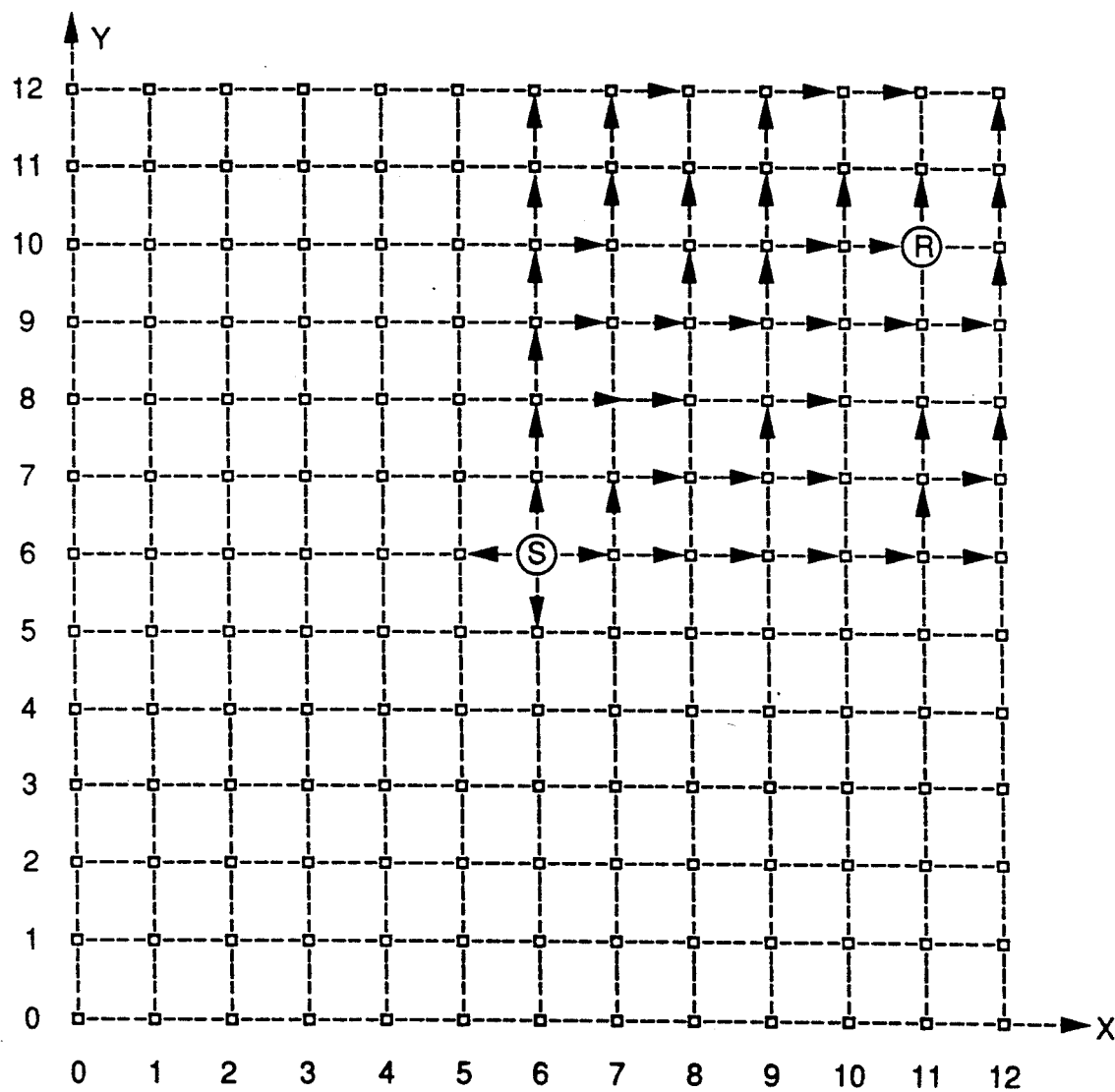
FIG. 4 is a graphical representation of signal transmission in a first come only served network.

Additional implications for a communication network with the first come only served nodes are shown in FIG. 4. The source node, S at (6,6), wants to transmit digital information (e.g. a file) to a receiver node, R (11,10). It is assumed that source S knows what channel receiver R is on, or that R is expecting the message and tunes to S's channel. S begins transmission. Nodes 6,7; 7,6; 6,5; and 5,6 all receive the transmission on the branch that connects it to the source since this is the shortest path. These nodes then only accept S's channel's signal on the respective branch which is denoted with an arrow. These nodes are referred to as configured for that channel. Note that only the upper right hand corner of the grid has the arrows shown explicitly. Nodes 6,7 and 7,6 now broadcast the message to node 7,7 (as well as to all the other nodes). Node 7,7 receives the signal on the two respective branches at approximately the same time if all of the branches are approximately the same length. In FIG. 4, it was assumed that the lower branch of node 7,7 was slightly shorter, causing the message to arrive via the lower branch first. A simple priority scheme could be used to protect against undefined states in the event of precisely simultaneous arrivals of both signals. This process of node configuration continues throughout the entire network. Finally, R receives the message via its left branch. It should be noted that every node receives the message but only through one path. In FIG. 4, the path from the source node 6,6 to receiver node 11,10 is: (6,6)-(6,7)-(6,8)(6,9)-(7,9)-(8,9)-(9,9)-(9,10)-(10,10)-(11,10).

Rerouting is easily accomplished should a node or branch fail. Each node recognizes that the carrier is not present. So each node de-configures for that channel. However, if the transmission was not completed, the nodes are then reconfigured as they receive the channel signal again since the node is not currently configured for that channel. In this way a problem area can be avoided automatically. When the intended receiver of the information regains the connection, a higher level decision (say, by the operator) must be made if a retransmission is necessary. It may be noted that adding nodes requires no rewiring, or reconfiguration of the network. New nodes are simply connected to a previously installed node via an unused branch. The network is accessed via channel detection. If the source wants to talk to someone on a particular channel, the source first listens to that wavelength to determine if the channel is occupied. If it is, another channel must be used. If that channel's wavelength is not detected, the source is free to transmit.

Figure 5:
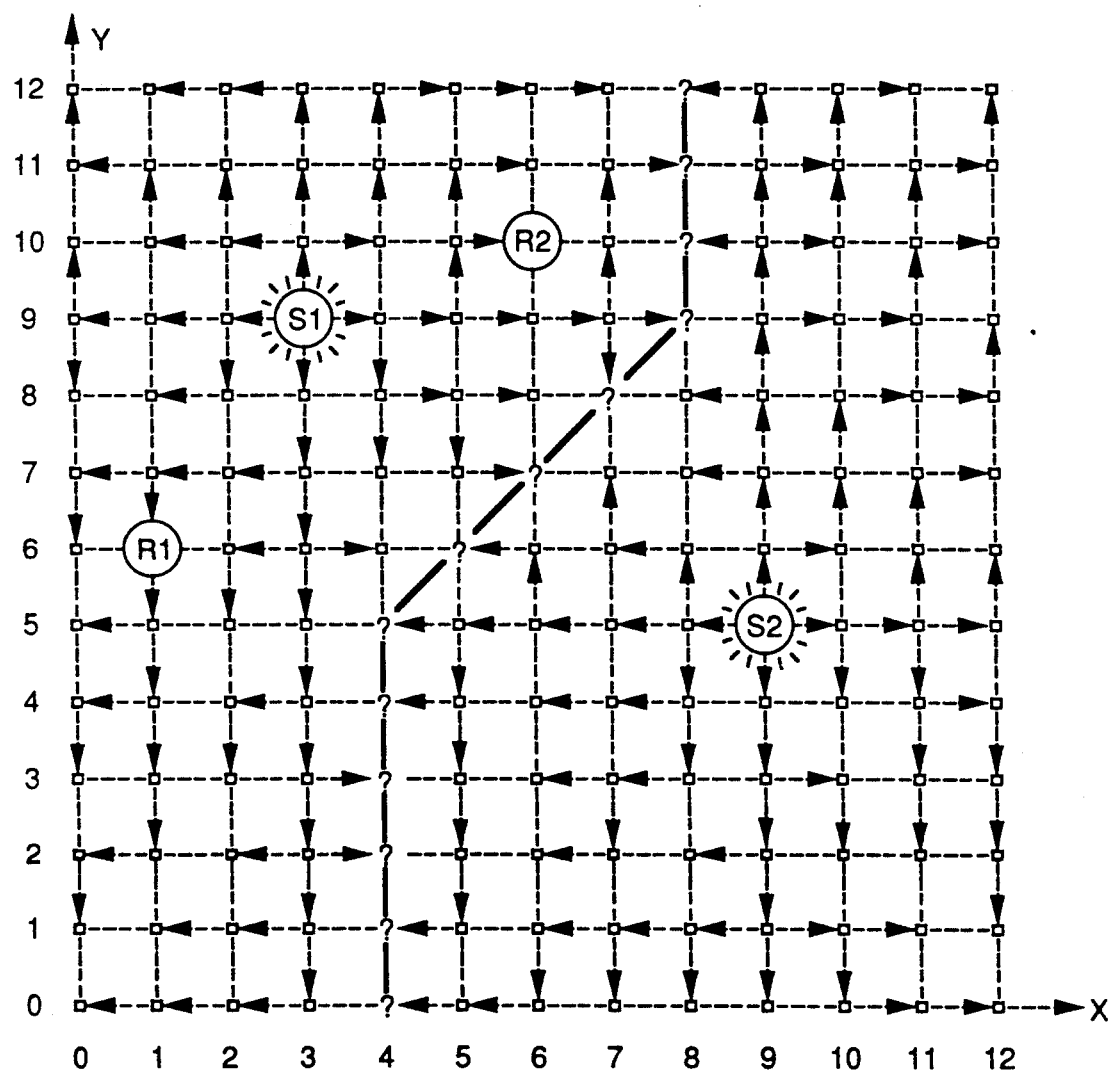
FIG. 5 is a graphical representation of simultaneous access on the same channel involving two senders and receivers.

Turning now to FIG. 5 which illustrates the situation of simultaneous access, i.e. when two sources transmit on the same channel at the same time. The two source nodes are denoted S1 and S2, while their respective destination nodes are R1 and R2. When the transmissions start, each node is configured as per the first come only served protocol. In this situation, the two difference transmissions, as well as the multiple paths of the same transmissions to reach a node first, are competing.

The branches of the nodes with closed arrows indicate the transmission from S1 reached the node first and from that branch. The open arrows indicate the S2 transmission was first. In the vicinity of each source node, nodes have been configured by the respective source transmission. This is true until the "line of question marks" is reached. These are nodes that are approximately equidistant from either S1 or S2. Due to the slight differences in the fiber cable lengths, some of the "question mark" nodes will be configured from the S1 side (4,3) and others from the S2 side (4,4). It should be noted that S1 transmissions do not interfere with S2 transmissions due to the first come only served protocol. Node 4,4 transmits the S2 transmission on all of its branches, while node 3,4 broadcasts the S1 transmission. So on the branch that connects nodes 4,4 and 3,4 the S1 and S2 message will interfere. But neither node accepts reception of the channel on this branch. Effectively, S2's message stops at 4,4. Note that the intended receiver does get the transmission if the receive is on the source's side of the "line of question marks". In FIG. 4, R1 is such a receiver and gets the message sent by S1 with no problems. However, R2 is on the wrong side of the line, and does not receive S2's transmission. This problem can be resolved if acknowledgments are required to indicate reception. In this case, S2 sends the message, and waits for a certain time for an acknowledgment from the intended receiver. R2 does not receive the message so no acknowledgment is sent. After S2's "wait for acknowledgment" timer times out, another channel is chosen and the entire access protocol is repeated. In this example, if R2 was on the S2 side of the line, the use of the same channel by two transmitters would be transparent to both transmitters and receivers. This is a decentralized access protocol in that no supervisory channel has to be accessed first to get on the network. With the use of an acknowledgment, problems are corrected automatically. This acknowledgment does not have to be standardized. It can be defined entirely by the sender. An alternate vehicle for acknowledgments could be an optic signal. Here, every channel would have an associated optical acknowledgment subchannel. When the intended destination node receives the message, this optic subchannel would be pulsed to indicate reception.

Figure 6:
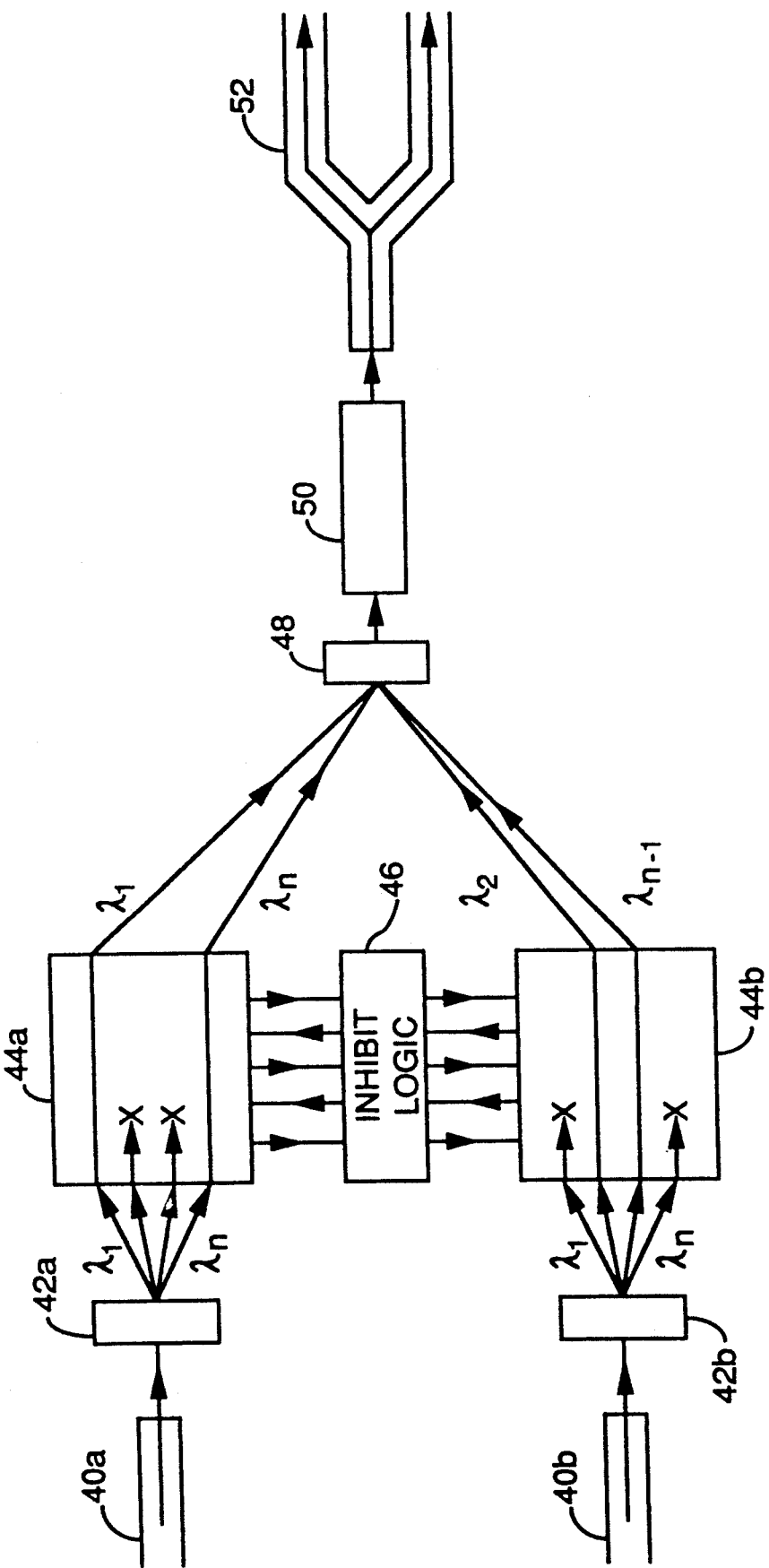
FIG. 6 is a block diagram of an optical two input, two output first come only served node.
Figure 7:
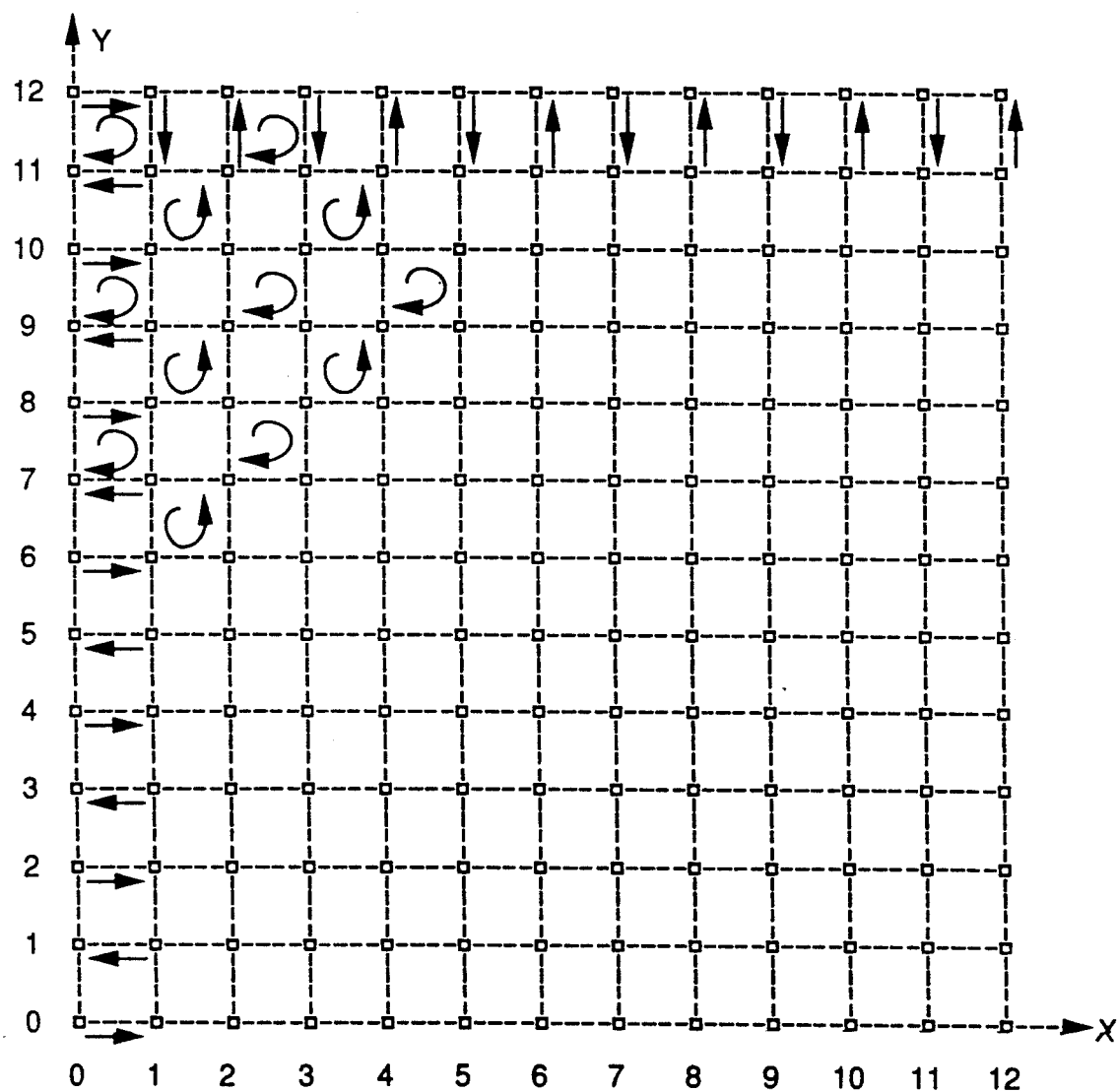
FIG. 7 is a graphical representation of a ringlets or one-way streets network.

The first come only served network has been described using the type of nodes depicted in FIG. 2. There is shown in FIG. 6 an additional embodiment of the nodes. It may be noted that only two branches can be used as inputs and outputs. While this simplifies the implementation, the network characteristics are essentially identical to those previously described. Instead of having a grid network, the nodes are arranged as in FIG. 7 to provide a ringlet network or a network of nodes are arranged as in FIG. 7 to provide a ringlet network or a network of one-way streets. In FIG. 6, light is allowed to enter from two branches both of which comprise a single mode optical fiber 40a, 40b. The channels (wavelengths) are separated by the demultiplexer 42a, 42b and then enter an optical switch 44a, 44b. This switch can be thought of as a set of filters that pass or stop particular channels based upon the inhibit logic unit 46. This inhibit logic decides which branch received the channel first and turns the filter for that branch and wavelength to pass, while turning the filter for the same channel on the other branch to stop. The channels are then combined by the multiplexer 48, amplified in an optical amplifier 50, and sent to the two transmitting branches by means of splitter unit 52.

The first come only served network has decentralized adaptive routing and access. The network concept was developed and described for a large bandwidth, optical network. However, the concepts apply to limited bandwidth, non-optical systems. The system does use more bandwidth than conventional networks due to the flooding, but offers more reliability. In addition, any type of modulation scheme is allowed on the network since addresses or other digital routing schemes are not employed. Consequently, analog as well as digital information under any format can be used on the network.

Although the invention has been described with reference to a particular embodiment, it will be understood to those skilled in the art that the invention is capable of a variety of alternative embodiments within the spirit and scope of the appended claims.

What is claimed is

1. A first come only served communications network comprising in combination:

a plurality of nodes arranged in a grid matrix configuration, adjacent nodes of said plurality of nodes being operatively connected to each other by a branch, each node of said plurality of nodes being connected to at least 2 branches, each of said branches comprising a separate input cable and a separate output cable, each node comprising a first come only served logic control unit which receives and processes all incoming signals at its respective node to determine which signal of a plurality of signals is the first to arrive at that node, said first come only served logic control unit including a bus cable which is operatively connected to each branch at that node, said first come only served logic control unit enabling the first signal to arrive to be applied to said bus cable and thereby be transmitted out of said node on all of the branches connected thereto;

means for transmitting signals between any node of said plurality of nodes, said signal transmitting means being operatively connected to any node of said plurality of nodes, any number of said signal transmitting means being utilized in said grid matrix and in any configuration; and means for receiving signals, said signal receiving means being operatively connected to any node of said plurality of nodes, said signal receiving means receiving a message from any signal transmitting means in said matrix;

said first come only served logic control unit comprising in combination:

means for carrier detection operatively connected respectively to each branch to receive a signal therefrom, means for latching operatively connected respectively to said carrier detection means to receive a signal therefrom, said latching means providing a latch signal, means for counting operatively connected respectively to said latching means to receive said latch signal, said counting means to stop counting upon receipt of said latch signal, said counting means providing a time of arrival count, a latch reset means is operatively connected respectively to said carrier detection means to reset said latching means when no signal is present in said carrier detection means, and a comparator means operatively connected to said counting means to compare time of arrival counts to determine the first arrived signal, said comparator means providing an enable signal in response to the first arrived signal determination.

2. A first come only served communications network as described in claim 1 wherein grid matrix configuration is n-dimensional and, said n-dimensional equals two.

3. A first come only served communications network as described in claim 2 wherein said n-dimensional equals three.

4. A first come only served communications network as described in claim 1 wherein said input and output cables comprise an electrical connection.

5. A first come only served communications network as described in claim 3 wherein said input and output cables comprise an optical connection.

6. A first come only served communications network as described in claim 3 wherein each branch includes an input control means which is controlled by said enable signal from said logic control unit and an output control means.

* * * * *